United States Patent
He et al.

(10) Patent No.: US 7,568,396 B2
(45) Date of Patent: Aug. 4, 2009

(54) METHOD OF DETERMINING STRESS

(75) Inventors: Jun He, Singapore (SG); Jun Zhao, Shanghai (CN); Ming Li Tan, Singapore (SG)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 11/554,574

(22) Filed: Oct. 30, 2006

(65) Prior Publication Data

US 2007/0056381 A1 Mar. 15, 2007

Related U.S. Application Data

(62) Division of application No. 10/912,989, filed on Aug. 5, 2004, now abandoned.

(51) Int. Cl.
*G01B 7/16* (2006.01)
(52) U.S. Cl. ........................................ 73/777
(58) Field of Classification Search ................ 73/777, 73/862.68, 721, 172
See application file for complete search history.

(56) References Cited

U.S. PATENT DOCUMENTS

| | | | | |
|---|---|---|---|---|
| 2,982,127 A * | 5/1961 | Scott | ............................ | 73/775 |
| 4,166,384 A * | 9/1979 | Matsuda et al. | ......... | 37/862.634 |
| 4,605,919 A * | 8/1986 | Wilner | ........................ | 338/2 |
| 4,738,146 A * | 4/1988 | Baumgartner et al. | .... | 73/862.68 |
| 4,777,826 A * | 10/1988 | Rud et al. | ..................... | 73/708 |
| 4,939,496 A * | 7/1990 | Destannes | ..................... | 338/2 |
| 5,539,158 A * | 7/1996 | Utsunomiya et al. | ......... | 177/211 |
| 6,469,537 B1 * | 10/2002 | Akram et al. | ............... | 324/765 |
| 6,509,201 B1 * | 1/2003 | Wright | ........................ | 438/16 |
| 6,634,113 B1 * | 10/2003 | Almaraz et al. | .......... | 33/366.11 |
| 6,816,301 B1 * | 11/2004 | Schiller | ...................... | 359/290 |
| 7,116,209 B2 * | 10/2006 | Hermann et al. | ............... | 338/2 |
| 2006/0001521 A1 * | 1/2006 | Nakao et al. | ................... | 338/2 |

* cited by examiner

*Primary Examiner*—Lisa M Caputo
*Assistant Examiner*—Octavia Davis

(57) ABSTRACT

A micromachined strain gauge comprising a plastically deformable piezoresistive microstructure formed on a surface of a substrate so that deformation of the substrate plastically deforms the microstructure to thereby change the resistance of the microstructure. The stress in the substrate can be determined from the change in the resistance of the microstructure.

12 Claims, 5 Drawing Sheets

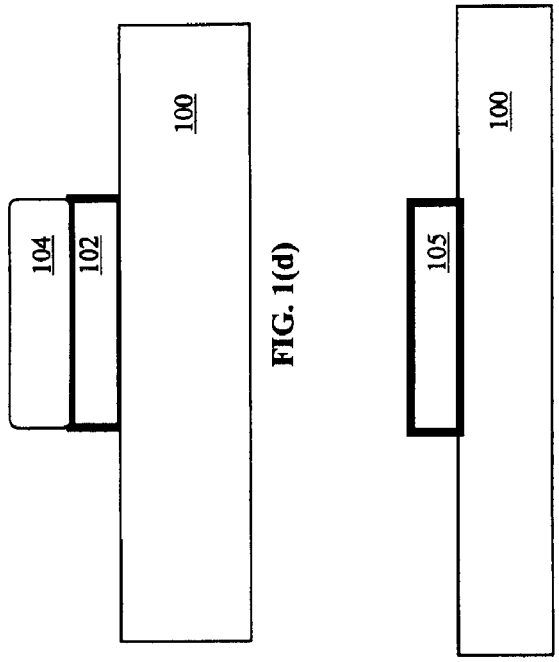
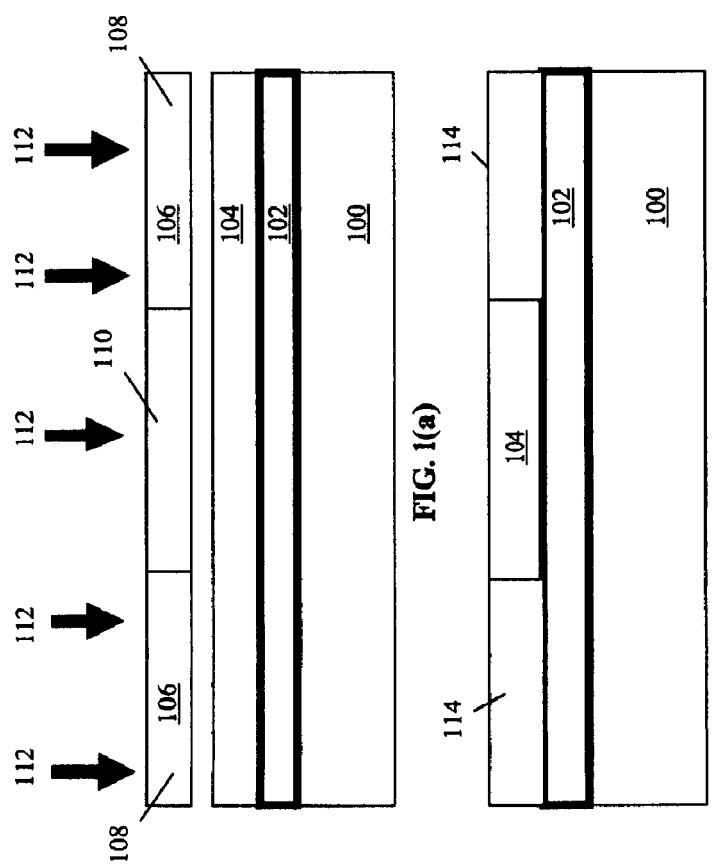

METHOD OF DETERMINING STRESS

CROSS-REFERENCE TO RELATED APPLICATIONS

This application is a divisional of U.S. application Ser. No. 10/912,989, filed Aug. 5, 2004 now abandoned, hereby incorporated by reference.

FIELD OF THE INVENTION

The present invention relates to semiconductor wafer processing, and more particularly to a micromachined wafer strain gauge.

BACKGROUND OF THE INVENTION

Semiconductor devices, such as microelectromechanical systems (MEMS) and integrated circuits, are fabricated on semiconductor wafers by many different processing steps, sometimes as many as several hundred. These steps include deposition, etching, implantation, doping, and a variety of other processing steps.

The processing steps involved in fabricating semiconductor devices on wafers often result in stress-induced defects in the wafer, such as voids or cracks. These process-induced stress defects can reduce fabrication yield and adversely affect the reliability and performance of semiconductor devices fabricated on the wafers.

Because of the problems that can be caused by stresses induced in semiconductor wafers by fabrication processes, it highly desirable to be able to directly measure such stresses. These stress measurements can be used, for example, to identify wafers that are likely to provide low yields of semiconductor devices or which might produce devices prone to early failure.

Conventional strain gauges are generally unsuitable for directly measuring stresses built up in the wafer substrate during wafer fabrication. Electrical resistance strain gauges conventionally require a constant power supply. A constant power supply is incompatible with the conditions of wafer processing, such as etching in a corrosive wet bath and ion implantation in a high vacuum chamber.

Conventional mechanical and optical strain gauges typically include macroscopic moving parts that cannot readily be scaled down for microfabrication on wafers. Even if they can be microfabricated, their moving parts are incompatible with the conditions of wafer processing, such as high speed spinning during wafer lapping, grinding and polishing.

A need therefore exists for an integrated strain gauge that can be exposed to all of the conditions of wafer processing so that process-induced stress in wafers can be directly measured in-line. This need is particularly felt in wafer processing of MEMS products, such as inkjet printer firing units. This is because MEMS wafer processing typically involves high-stress process steps such as wafer drilling and laser ablation that are not present in conventional integrated circuit wafer processing.

SUMMARY OF THE INVENTION

According to the present invention, there is provided a micromachined strain gauge. The gauge includes a plastically deformable piezoresistive microstructure formed on a surface of a substrate so that deformation of the substrate plastically deforms the microstructure to thereby change the resistance of the microstructure, wherein stress in the substrate can be determined from change in the resistance of the microstructure.

DESCRIPTION OF THE DRAWINGS

FIGS. 1(a) to 1(e) are schematic sections of a substrate showing the formation thereon of a micromachined strain gauge according to an embodiment of the present invention.

DETAILED DESCRIPTION OF THE EMBODIMENTS

Figure 2:
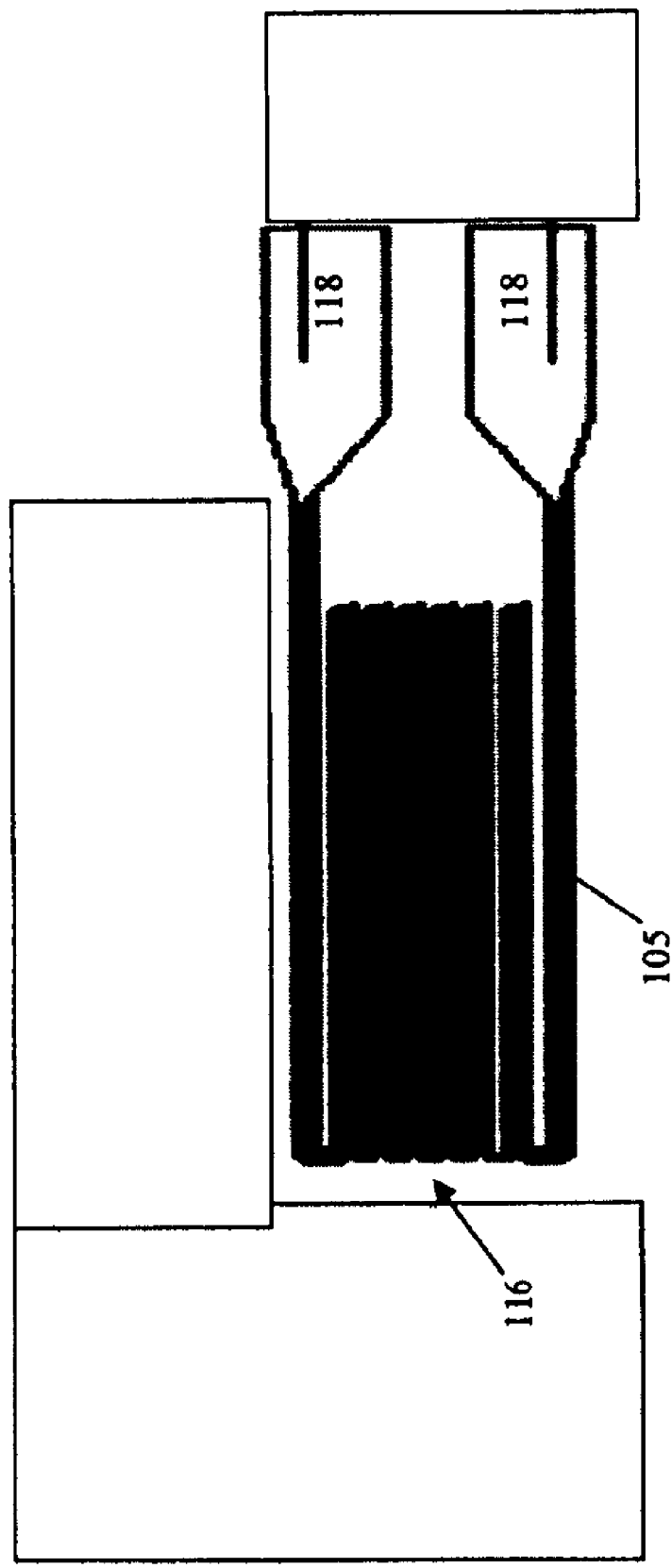
FIG. 2 is a top view of a micromachined strain gauge according to an embodiment of the present invention.

FIGS. 1(a) to 1(e) illustrate the sequential steps in producing a micromachined strain gauge according to an embodiment of the present invention.

Referring initially to FIG. 1(a), a structural layer 102 of plastically deformable piezoresistive material is deposited on a substrate 100. Plastic deformation is a deformation of a body caused by an applied stress which remains after the stress is removed. Piezoresistance is a change in electrical resistance of a body when subjected to stress. A material having both these properties is selected for the structural layer 102. Examples of suitable piezoresistive material for the structural layer 102 include ductile metals or metal alloys.

The structural layer 102 is coated by a photoresist layer 104. A mask 106 having transparent regions 108 and precisely patterned opaque regions 110 is illuminated by ultraviolet light 112 to cast a highly detailed shadow onto the photoresist layer 104. The regions 114 of the photoresist layer 104 receiving an exposure of ultraviolet light 112 are chemically altered (FIG. 1(b)).

After exposure, the photoresist layer 104 is immersed in a developer that chemically removes the exposed regions 114 to expose portions of the structural layer 102 (FIG. 1(c)). The exposed portions of the structural layer 102 are then etched away in a wet bath (FIG. 1(d)). Lastly, the remaining photoresist 104 is removed, resulting in a micromachined strain gauge 105 on the substrate 100 (FIG. 1(e)).

FIG. 2 is a more detailed illustration of the strain gauge 105. As can be seen in FIG. 2, the micromachined strain gauge 105 is photolithographically patterned by mask 106 in a meander 116. The meander 116 is designed to provide maximum gauge resistance while keeping both the length and width of the micromachined strain gauge 105 to a minimum. Connector tabs 118 are provided on the respective ends of the meander 116.

The general principles of the micromachined strain gauge 105 will now be discussed. When force is applied to an object, stress and strain are the result. Stress is uniform the force per unit area acting on the object, as given by:

$$\sigma = \frac{F}{A}$$

where: σ=stress
F=force applied
A=unit area.

When an object experiences stress, the object will experience deformation. Strain is a measurement of the intensity of this deformation and can be defined as the change in distance between two points belonging to the same object. More specifically, strain is the deformation per unit length of the object in any dimension resulting from stress, as given by:

$$\varepsilon = \frac{\Delta L}{L}$$

where: $\epsilon$=strain
$\Delta L$=change in length
L=original length.

According to Hooke's law, within the elastic limit of a material, the stress is proportional to the strain, as given by:

$$Y = \frac{\sigma}{\varepsilon}$$

where: Y=Young's Modulus
σ=stress
$\epsilon$=strain.

A piezoresistive material, such as metal or metal alloy, subjected to mechanical strain exhibits a change in electrical resistance. The change in resistance is proportional to the strain, as given by:

$$\frac{\Delta R}{R} = GF \cdot \varepsilon$$

where: $\Delta R$=change in resistance
R=original resistance
GF=gauge factor
$\epsilon$=strain.

Thus, variations in the electrical resistance of the piezoresistive material can be measured as an indication of strain/stress. As described above, the micromachined strain gauge 105 comprises a plastically deformable piezoresistive material such as a ductile metal or metal alloy. When the substrate 105 is subjected to mechanical strain, the plastically deformable micromachined strain gauge 105 deforms and remains deformed after the strain is removed. Thus, the micromachined strain gauge 105 retains the peak value of the strain even when the strain on the substrate 100 is released. This is because the micromachined strain gauge 105 comprises a plastically deformable piezoresistive material that has a pure plastic response against applied load. The peak value of the strain applied to the substrate 100 is mechanically memorised in the plastic deformation of the micromachined strain gauge 105. Because the micromachined strain gauge 105 is piezoresistive, the peak strain can be retrieved by measuring the change in electrical resistance caused by the plastic deformation.

Figure 3:
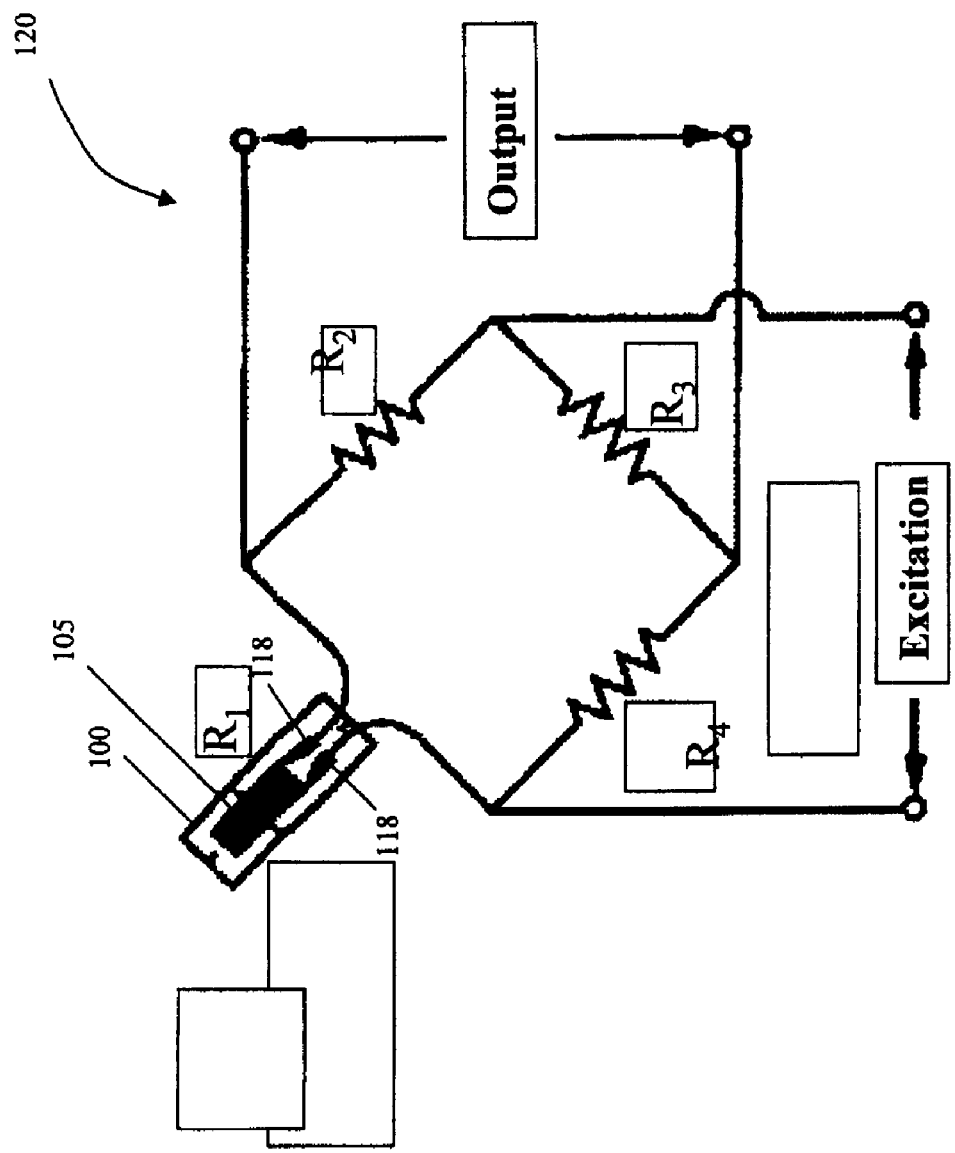
FIG. 3 is a schematic top view of a micromachined strain gauge according to an embodiment of the present invention connected to a Wheatstone bridge circuit.

The micromachined strain gauge 105 does not need any power supply to measure the peak strain applied to the substrate 100. The value of the peak strain is contained in the mechanical memory of the micromachined strain gauge 105 in the form of a change of resistance. A small power supply is required only when data retrieval becomes necessary. To retrieve the peak strain from the mechanical memory, the micromachined strain gauge 105 is connected to a resistance measuring circuit such as a conventional Wheatstone bridge circuit 120, as can be seen in FIG. 3. The Wheatstone bridge circuit 120 connects to the tabs 118 of the micromachined strain gauge 105 and converts the resistance change in the micromachined strain gauge 105 into voltage output, as given by:

$$e = \frac{R_1 R_3 - R_2 R_4}{(R_1 + R_2)(R_3 + R_4)} E$$

where: e=voltage output
E=exciting voltage
$R_1$=resistance of micromachined strain gauge 105
$R_2$~$R_4$=resistance of fixed resistors.

Assuming the value R as R=R1=R2=R3=R4, and that the micromachined strain gauge 105 resistance varies from R to R+$\Delta$R due to the peak induced strain, the output voltage $\Delta$e due to the strain is given as follows:

$$\Delta e = \frac{\Delta R}{4R + 2\Delta R} E$$

When $\Delta R \ll R$ this is approximated to:

$$\Delta e = \frac{\Delta R}{4R} E = \frac{E}{4} GF\varepsilon$$

where: GF=gauge factor of micromachined strain gauge 105
$\epsilon$=peak induced strain.

Thus, the peak induced strain in substrate 100 can be determined by measuring the change in output voltage $\Delta$e of the Wheatstone bridge circuit 120.

In an embodiment, a micromachined strain gauge is surface micromachined (as described above) from gold that has been sputter deposited on a die of a semiconductor wafer, such as a silicon wafer.

Gold is a material that can be utilized in the formation of the micromachined strain gauge because gold is ductile, stable, and has good strain characteristics (from around 40 MPa to 400 Mpa) and strain sensitivity (or gauge factor). Further, gold can be bonded on wafer die by conventional surface micromachining techniques including thin film deposition, patterning and etching. Finally, gold is advantageous for this implementation because gold is already conventionally used in wafer processing to fabricate semiconductor devices on wafer die.

Figure 4:
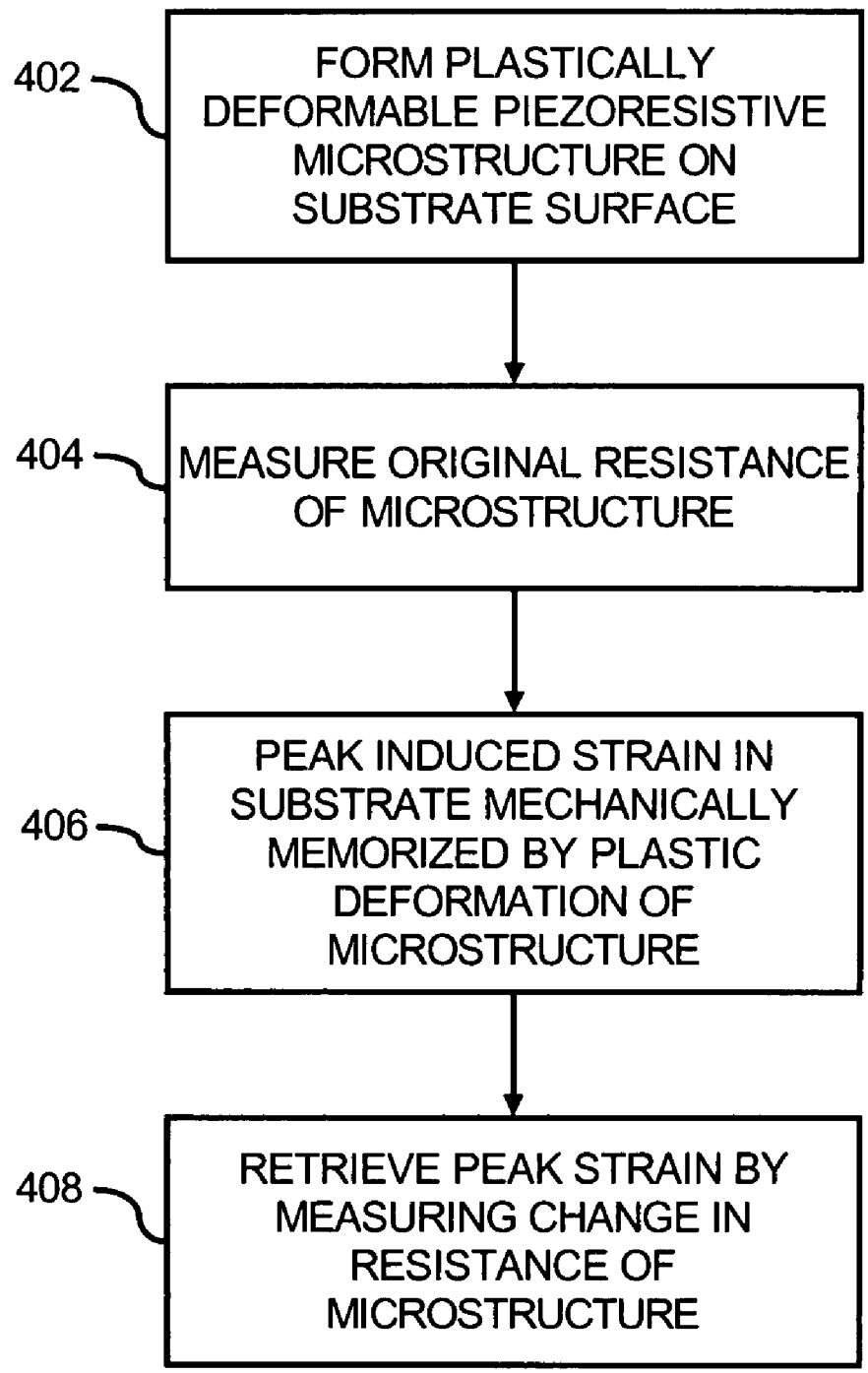
FIG. 4 is a flowchart detailing a method of determining stress in a substrate.

Referring to FIG. 4, a method of determining stress in a substrate comprises forming a plastically deformable piezoresistive microstructure on a surface of the substrate (Step 402). The original electrical resistance of the plastically deformable piezoresistive microstructure is measured (Step 404) by a resistance measuring circuit such as a conventional Wheatstone bridge circuit. The peak value of subsequently induced strain in the substrate is mechanically memorised in the plastic deformation of the microstructure (Step 406). The peak strain is retrieved by measuring the change in electrical resistance of the microstructure caused by the plastic deformation (Step 408).

The micromachined strain gauge in accordance with an embodiment can be used to determine the stress induced in wafers by wafer processing of integrated circuits or MEMS.

Specifically, a plurality of micromachined strain gauges are respectively formed on a corresponding plurality of die of a wafer. The resistance in individual micromachined strain gauges is measured and recorded before the start of conventional wafer processing. The embedded micromachined strain gauges are then exposed to all the conditions of one or more conventional wafer processing steps. The resistance in individual micromachined strain gauges is then measured again and recorded. The stress induced in individual dies of the wafer by wafer processing can then be determined from variations in the resistance of the corresponding micromachined strain gauges. This die-specific stress information is advantageous for wafer process design, production monitoring and wafer failure analysis. Such die-specific stress information is particularly advantageous in wafer processing of MEMS products, such as inkjet printer firing units. This is because MEMS wafer processing typically involves high-stress process steps such as wafer drilling and laser ablation that are not present in conventional integrated circuit wafer processing.

Figure 5:
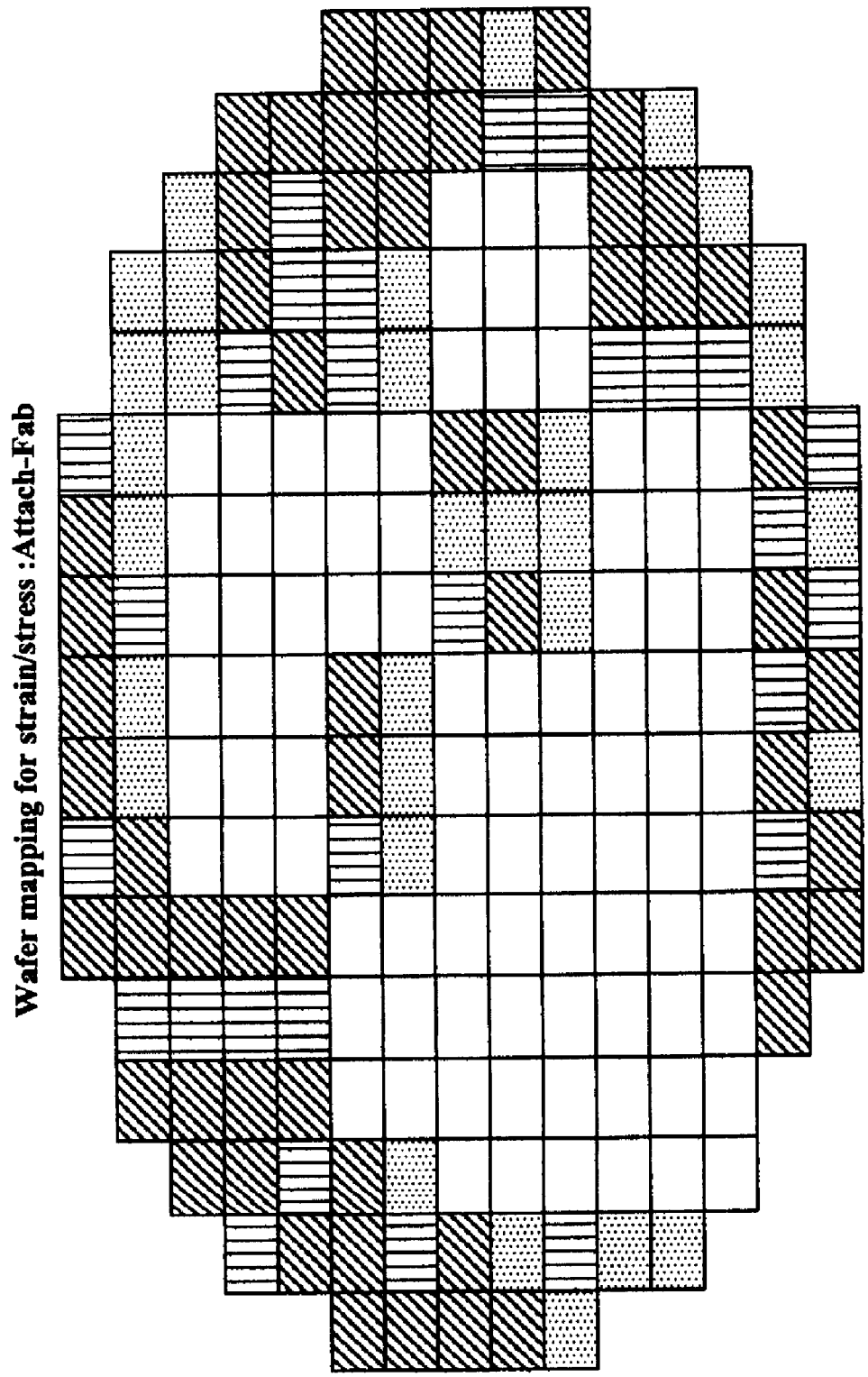
FIG. 5 is a map of the stress distribution over the surface of the wafer generated by micromachined strain gauges according to an embodiment of the present invention.

As shown in FIG. 5, the die-specific stress data can be used to generate a wafer map showing the surface distribution of process-induced stress in the wafer. The squares correspond to individual die of the wafer. The squares filled with diagonal hatching indicate very high levels of process-induced stress sufficient to crack the die. The squares filled with vertical hatching indicate die with high levels of process-induced stress levels. The squares filled with dots indicate die with acceptable process-induced stress levels, whereas the remaining empty squares indicate that no stress measurement was recorded.

It will be appreciated that embodiments of the micromachined strain gauge according to the present invention can be exposed to all of the conditions of wafer processing so that process-induced stress in wafer die can be directly measured in-line.

Those skilled in the art will appreciate that the invention described herein is susceptible to variations and modifications other than those specifically described. It is to be understood that the invention includes all such variations and modifications which fall within its spirit and scope.

What is claimed is:

1. A method of determining stress induced in a wafer by wafer processing, said wafer comprising at least one die, said method comprising the steps of:
    forming at least one plastically deformable piezoresistive strain gauge microstructure on at least one die of the wafer so that strain on the die plastically deforms the strain gauge micro structure to thereby change the resistance of the strain gauge micro structure, wherein said strain gauge micro structure is formed of a ductile metal or metal alloy that remains deformed after the strain is removed;
    measuring the resistance of the strain gauge microstructure before wafer processing;
    measuring the resistance of the strain gauge microstructure after wafer processing; and
    determining stress induced in the die by wafer processing from change in the resistance of the strain gauge micro structure.

2. The method of claim 1, wherein said wafer comprises a plurality of dies and a plurality of plastically deformable piezoresistive strain gauge microstructures are respectively micromachined on a corresponding plurality of dies.

3. The method of claim 2, further comprising the step of generating a wafer map of the stress induced in individual die by wafer processing.

4. The method of claim 3, wherein the wafer processing comprises processing wafers to fabricate microelectromechanical systems (MEMS) thereon.

5. The method of claim 1, wherein measuring the resistance of the strain gauge microstructure before wafer processing and after wafer processing further comprises measuring the resistance of the strain gauge micro structure with a resistance measuring circuit.

6. The method of claim 5, further comprising:
    disconnecting the resistance measuring circuit following measuring of the resistance before wafer processing; and
    connecting the resistance measuring circuit prior to measuring of the resistance of the strain gauge microstructure after wafer processing.

7. The method according to claim 5, further comprising:
    disconnecting the resistance measuring circuit during wafer processing.

8. A method of determining stress induced in a wafer by wafer processing, said wafer comprising at least one die, said method comprising the steps of:
    positioning at least one plastically deformable strain gauge microstructure to detect strain on the at least one die, said plastically deformable strain gauge microstructure plastically deforming when the at least one die is deformed, wherein said strain gauge microstructure is formed of a ductile metal or metal alloy that remains deformed after the strain is removed;
    measuring the resistance of the strain gauge microstructure before wafer processing;
    measuring the resistance of the strain gauge microstructure after wafer processing; and
    determining stress induced in the die by wafer processing from a change in the resistance of the strain gauge micro structure caused by the plastic deformation.

9. The method of claim 8, wherein said wafer comprises a plurality of dies and a plurality of plastically deformable strain gauge microstructures are respectively positioned to detect strain on a corresponding plurality of dies.

10. The method of claim 8, wherein measuring the resistance of the strain gauge microstructure before wafer processing and after wafer processing further comprises measuring the resistance of the strain gauge microstructure with a resistance measuring circuit.

11. The method of claim 10, further comprising:
    disconnecting the resistance measuring circuit following measuring of the resistance before wafer processing; and
    connecting the resistance measuring circuit prior to measuring of the resistance of the strain gauge microstructure after wafer processing.

12. The method according to claim 10, further comprising:
    disconnecting the resistance measuring circuit during wafer processing.

\* \* \* \* \*

UNITED STATES PATENT AND TRADEMARK OFFICE
CERTIFICATE OF CORRECTION

PATENT NO. : 7,568,396 B2  Page 1 of 1
APPLICATION NO. : 11/554574
DATED : August 4, 2009
INVENTOR(S) : Jun He et al.

It is certified that error appears in the above-identified patent and that said Letters Patent is hereby corrected as shown below:

In column 5, line 49, in Claim 1, delete "micro structure" and insert -- microstructure --, therefor.

In column 5, line 50, in Claim 1, delete "micro structure," and insert -- microstructure, -- therefor.

In column 5, line 51, in Claim 1, delete "micro structure" and insert -- microstructure --, therefor.

In column 5, lines 59-60, in Claim 1, delete "micro structure" and insert -- microstructure --, therefor.

In column 6, line 12, in Claim 5, delete "micro structure" and insert -- microstructure --, therefor.

In column 6, lines 39-40, in Claim 8, delete "micro structure" and insert -- microstructure --, therefor.

Signed and Sealed this

Fifteenth Day of December, 2009

David J. Kappos
*Director of the United States Patent and Trademark Office*